H. Keck,
Elevator.

N° 79,130. Patented June 23, 1868.

Witnesses
Robert C. Fox
James T. Fitch

Inventor
Henry Keck
G. B. Fowler

United States Patent Office.

HENRY KECK, OF CANAAN, OHIO.

Letters Patent No. 79,130, dated June 23, 1868.

---

IMPROVEMENT IN GRAIN AND HAY-ELEVATOR.

---

The Schedule referred to in these Letters Patent and making part of the same.

---

TO ALL WHOM IT MAY CONCERN:

Be it known that I, HENRY KECK, of Canaan, in the county of Wayne, and State of Ohio, have invented a new and improved Hay and Grain-Elevator; and I do hereby declare that the following is a full, clear, and exact description of the construction and operation of the same, reference being had to the accompanying drawings, making a part of this specification, in which—

Like letters in both figures of the drawings indicate like parts.

Figure 1:
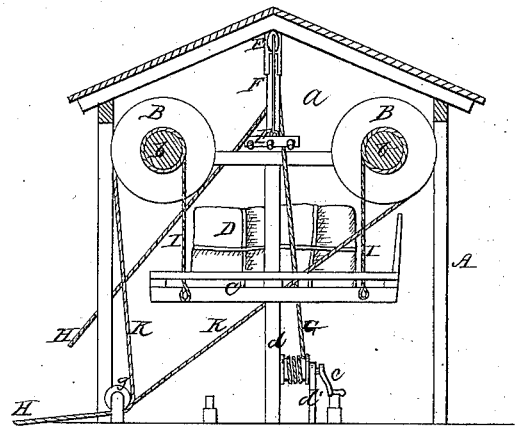
Figure 1 is a transverse vertical section of a barn, showing my improved devices for elevating and unloading hay or grain.
Figure 2:
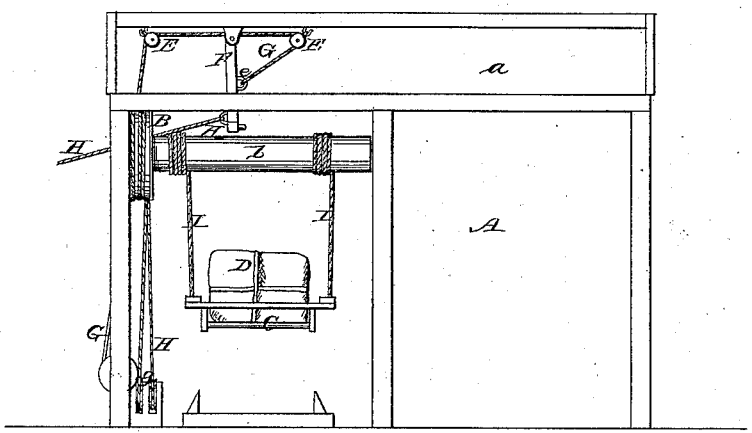
Figure 2 is a side elevation.

My invention relates to that class of devices which are designed to economize labor and time in the elevating and unloading of hay or grain from vehicles, and the proper storage of the same in such lofts of stables or barns as may be appropriated for the purpose.

It consists in the employment of two windlass-devices, for lifting a platform or other receptacle for hay or long provender, in combination with a rake, worked by a crank and pulley, for the unloading and more convenient storage of the same, when the whole or component parts of the device are permanently located in a barn or other place designated for the reception of the article.

To enable any one skilled in the art to make and use my invention, I will proceed to describe its construction and operation.

A represents the barn, having a loft, $a$, therein, for the storage of hay.

B B represent two windlass-wheels, rigidly attached to shafts $b\ b$, having their bearings upon the timbers of the loft, the wheels being eight feet in diameter, and having grooved peripheries for the reception and retention of the rope by which the platform is elevated.

C represents a platform, of quadrilateral shape, having in each corner thereof a hook or other device, for attaching ropes thereto, by which it is elevated.

D represents the load of hay, when placed upon the platform.

$c$ represents a crank, having its bearings in an upright beam, $d$, of the building, and in a slotted auxiliary upright, $d'$, rigidly attached to the said beam, having a pulley working in the aforesaid slot, which pulley is rigidly attached to the crank at that portion thereof, the crank and pulley being designed for operating the rake suspended at the roof of the barn-loft.

E E each represents a block and tackle, attached to the interior of the roof of the barn, for the reception of the rope or cordage for operating the rake.

F represents a rake, pivoted to and swinging from the roof of the barn at a point intermediate between the aforesaid blocks, and having, nearly intermediate between the extremities thereof, a staple, $e$, by which, in conjunction with the aforesaid crank, it is operated.

G represents the rope attached to the rake, which, from thence, passes over and under or around the pulley in front of it, and from thence over the pulley in its rear, and then extends and fastens to the pulley, in connection with the crank, upon which it is wound and unwound in the process of throwing up the hay with the rake.

H represents a rope attached by a staple to the lower part of the rake, to act as an adjunct of the rope operated by the crank as aforesaid.

I represents the ropes which lift the platform, by being wound upon the shafts attached to the windlass-wheels B B.

K K represent the ropes which are wound upon the wheels of the windlass.

The operation is as follows:

The hay or provender being loaded upon the platform, two men take hold respectively of the ropes wound upon the wheels, and proceed from each windlass, and, by drawing upon and unwinding the same, wind the ropes upon the shafts, which ropes are attached to the platform, and thereby elevate it.

The load being elevated to the desired height, the ropes proceeding from the windlass are passed under double pulley *g*, in a short upright attached to the beam or floor of barn, and then tied to a hook or other device, to hold the weight in position. The rake is then operated by the crank, as aforesaid, for the removal of the provender.

Having thus fully described my invention, what I claim therein as new, and desire to secure by Letters Patent, is—

The combination and arrangement of the windlasses B B, platform C, pulley and crank *c*, block and tackle E E, rake F, and double pulley *g*, when used in a barn, substantially in the manner and for the purpose as herein shown and set forth.

As evidence that I claim the foregoing, I have hereunto set my hand in the presence of two witnesses.

HENRY KECK.

Witnesses:
G. W. LITTELL,
C. G. CRANE.